United States Patent
Kida et al.

(10) Patent No.: US 7,883,796 B2
(45) Date of Patent: Feb. 8, 2011

(54) ELECTROCHEMICAL CELL

(75) Inventors: Tomohiko Kida, Miyagi (JP); Hideharu Onodera, Miyagi (JP); Shunji Watanabe, Miyagi (JP); Kensuke Tahara, Miyagi (JP); Yoshibumi Nakamura, Miyagi (JP)

(73) Assignee: Seiko Instruments Inc. (JP)

( * ) Notice: Subject to any disclaimer, the term of this patent is extended or adjusted under 35 U.S.C. 154(b) by 1271 days.

(21) Appl. No.: 11/185,656

(22) Filed: Jul. 20, 2005

(65) Prior Publication Data

US 2006/0035143 A1    Feb. 16, 2006

(30) Foreign Application Priority Data

Aug. 10, 2004    (JP) .............................. 2004-233811

(51) Int. Cl.
*H01M 2/00*    (2006.01)
*H01M 4/82*    (2006.01)
*H01M 2/02*    (2006.01)

(52) U.S. Cl. ................... 429/163; 29/623.1; 429/171

(58) Field of Classification Search .................. 429/185
See application file for complete search history.

(56) References Cited

U.S. PATENT DOCUMENTS

| | | | | |
|---|---|---|---|---|
| 5,538,177 | A | * | 7/1996 | Takahashi .................... 228/196 |
| 5,786,548 | A | * | 7/1998 | Fanucchi et al. .......... 174/50.54 |
| 5,858,572 | A | * | 1/1999 | Kim ........................... 429/186 |
| 2001/0012193 | A1 | * | 8/2001 | Watanabe et al. ............ 361/502 |
| 2003/0091901 | A1 | * | 5/2003 | Kaneda et al. ............ 429/231.4 |
| 2004/0157121 | A1 | * | 8/2004 | Watanabe et al. ............ 429/185 |
| 2006/0040177 | A1 | * | 2/2006 | Onodera et al. ............. 429/174 |

FOREIGN PATENT DOCUMENTS

| | | |
|---|---|---|
| JP | 56059457 A2 * | 5/1981 |
| JP | 04149958 | 5/1992 |
| JP | 08339943 | 12/1996 |
| JP | 2001216952 | 8/2001 |
| JP | 2003133186 | 5/2003 |

* cited by examiner

*Primary Examiner*—Dah-Wei D Yuan
*Assistant Examiner*—Adam A Arciero
(74) *Attorney, Agent, or Firm*—Adams & Wilks

(57) ABSTRACT

An electrochemical cell has a container having a main surface and a cavity containing therein a positive electrode, a negative electrode, a separator separating the positive and negative electrodes from one another, and an electrolyte. A sealing plate that seals the cavity of the container is bonded to the main surface of the container with an unoxidized weld.

18 Claims, 3 Drawing Sheets

ELECTROCHEMICAL CELL

BACKGROUND OF THE INVENTION

1. Field of the Invention

The present invention relates to an electrochemical cell.

2. Description of the Related Art

The electrochemical cell such as nonaqueous electrolyte secondary battery and electrical double layer capacitor has such characteristics as high energy density, light weight and small size, and has been used as a backup electric source of a timepiece function of a portable equipment, a backup electric source of a semiconductor memory, and the like. For these portable equipments, there are required a reduction in size, a reduction in weight and an increase in function, and there is demanded an additional high density mounting of the electrochemical cell.

Further, it is so adapted that, when the electrochemical cell is mounted to a circuit board, a reflow soldering method is generally used. The reflow soldering method is a method in which, after a solder cream has been applied to a portion, of the circuit board, to be soldered, there is mounted thereon the electrochemical cell, and the soldering is performed for every circuit board by causing it to pass within a furnace at high temperatures of 200-260° C. In order to endure the reflow soldering, a high heat resistance is demanded for the electrochemical cell.

There is known an electrochemical cell which is sealed by welding a container and a sealing plate.

This electrochemical cell is high in its sealing strength and excellent in its heat resistance because the container and the sealing plate are joined by a resistance welding and the like.

Since the electrochemical cell sealed by the welding can be made an arbitrary shape because it is not sealed by a caulking as different from a conventional coin type electrochemical, a mounting area can be effectively put to practical use.

Although the above electrochemical cell has been sealed by welding the container and the sealing plate in the atmospheric air, an internal resistance increase and a capacity decrease have become problems.

This results from the fact that, since the conventional electrochemical cell is sealed by the welding in the atmospheric air, a weld zone is oxidized and a corrosion resistance decreases.

It is explained by using FIG. 4. Hitherto, an electrode 2, an electrode 4 and an electrolyte 5 have been contained in a container 1, and a sealing plate 6 and the container 1 have been sealed by being welded in the atmospheric air. Through a weld zone 7, the container 1 and the sealing plate 6 have been joined. Since they are welded in the atmospheric air, the weld zone 7 has been oxidized and the corrosion resistance has decreased.

The weld zone 7 whose corrosion resistance has decreased contacts with the electrolyte 5 inside the electrochemical cell, so that a corroded part 8 has occurred. A voltage is applied to an inside of the electrochemical cell, where the corrosion is liable to progress and, especially if an organic solvent is used in the electrolyte, the voltage to be applied becomes high and thus the corrosion becomes severe.

By this corrosion, elements contained in the weld zone 7 are eluted into the electrolyte, and this causes a deterioration of the electrolyte and an impurity deposition onto an electrode active material, so that the internal resistance increase and the capacity decrease of the electrochemical cell are brought about. Further, it causes a decrease in sealing strength and a generation of leak of the solution. Additionally, by the decrease in sealing strength, since the electrochemical cell cannot endure an internal pressure increase at its heating time, its heat resistance decreases as well.

The 2nd problem to be solved is an oxidation of the organic solvent by a welding heat at the sealing time.

In the conventional electrochemical cell, although the container and the sealing plate have been welded in the atmospheric air, there has been a possibility that the organic solvent used in the electrolyte is oxidized and deteriorates by the welding heat and sparks generated at a welding time. The electrolyte of the electrochemical cell is used by diluting a high permittivity solvent whose viscosity is high with a low viscosity solvent. This low viscosity solvent is liable to be oxidized.

SUMMARY OF THE INVENTION

An object of the invention is to provide, by solving the above two problems of the prior art, an electrochemical cell in which the internal resistance increase and the capacity decrease don't occur.

In order to solve the above problems, the invention is one in which the seal-welding between the container and the sealing plate of the electrochemical cell is performed under an inert atmosphere.

An electrochemical cell of the invention has one pair of electrodes acting as a positive electrode and a negative electrode, a separator for separating the electrodes, an ion conductive electrolyte, a container accommodating the electrodes, the separator and the electrolyte, and a sealing plate for sealing the container, and is characterized in that the container and the sealing plate have been welded under an inert atmosphere.

Desirably, the inert atmosphere is nitrogen or argon.

In the electrochemical cell of the invention, in order to weld the container and the sealing plate, there may be used a resistance seam welding or a laser seam welding.

Further, if a welding apparatus is put into a glove box, an inside of the glove box is pressurized, and the container and the sealing plate are welded under the inert atmosphere, it is desirable because an external atmosphere is not mixed.

Additionally, if a dew point in the inert atmosphere is 0 degree or lower, water is hardly contained in the electrolyte comprising a nonaqueous solvent in the electrochemical cell, so that it is desirable.

In the electrochemical cell of the invention, a heat-resisting material may be used for the container, and a ceramic or a glass may be used.

Further, in the electrochemical cell of the invention, a resin may be used for the container, and there may be used a resin such as polyphenylene sulfide, polyethylene terephthalate, polyamide, polyimide, polyether ether-ketone, liquid crystal polymer, and epoxy resin.

In the invention, since the seal welding between the container and the sealing plate of the electrochemical cell is performed under the inert atmosphere, the weld zone is not oxidized and thus there is no fact that the corrosion resistance decreases, so that no corrosion occurs. For this reason, there is no fact that elements are eluted from the weld zone into the electrolyte, and it is possible to prevent the internal resistance increase and the capacity decrease of the electrochemical cell.

Hitherto, causes of the internal resistance increase and the capacity decrease of the electrochemical cell have been unclear.

The inventors found that the causes of the internal resistance increase and the capacity decrease resulted from a mixing of impurities, and found the fact that the impurities were eluted from the weld zone into the electrolyte. Additionally, it was found that, since the seal welding was performed in the atmospheric air in the conventional electrochemical cell, the weld zone was oxidized and the corrosion resistance decreased, and the corrosion of the weld zone selectively progressed inside the electrochemical cell.

If the invention is used, no corrosion occurs inside the cell and the internal resistance increase and the capacity decrease can be prevented, so that it is possible to provide an electrochemical cell whose characteristics are excellent. Additionally, since the weld zone is not corroded, the leak of the solution can be prevented and the sealing strength increases, so that there is no fact that a bursting occurs even in a case where an internal pressure of the electrochemical cell has raised under high temperatures.

Further, since the seam welding between the container and the sealing plate of the electrochemical cell is performed under the inert atmosphere, there is no possibility that the organic solvent contained in the electrolyte is oxidized and deteriorates.

By resistance-welding the container and the sealing plate in the inert atmosphere like the electrochemical cell according to the invention, the electrolyte can be prevented from being oxidized by the heat at the welding time and deteriorating.

DETAILED DESCRIPTION OF THE PREFERRED EMBODIMENT

Figure 1:
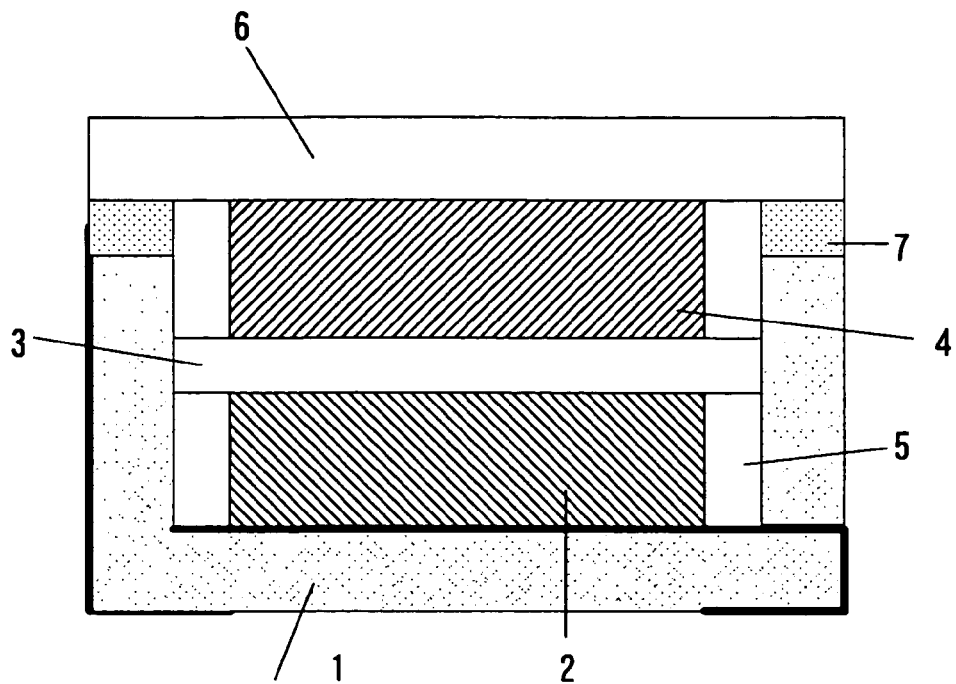
FIG. 1 is a sectional view of an electrochemical cell of the invention.

A structure of an electrochemical cell according to the invention is shown in FIG. 1. FIG. 1 is a sectional view of a nonaqueous electrolyte secondary battery or an electrical double layer capacitor according to the invention. Although a material of the container 1 is not limited, if there is used a heat resisting material such as ceramic, glass, or heat-resistant resin and epoxy resin, the heat resistance of the electrochemical cell is improved. In a case where the rein is used in the container, a metal terminal and the like are insert-molded.

Hereunder, the invention is explained by an example in which the ceramic was used in the container 1. The container was formed by laminating green sheets. On that occasion, by printing tungsten to the green sheet and applying a sintering treatment to it, the container having a tungsten wiring was formed. By coating this tungsten wiring with nickel, a gold plating and the like for a corrosion prevention and a soldering, a 1st connection terminal and a 2nd connection terminal were formed. The 1st connection terminal is disposed to an outside bottom face of the container 1 through its outside side face while being formed on an inside bottom face of the container 1 and penetrating through a wall face of the container 1, and accomplishes both rolls of a current collector and the connection terminal.

On an upper face of the 1st connection terminal formed on the inside bottom face of the container 1, there were lamination-disposed the electrode 2, a separator 3 made of glass fibers, and the electrode 4. Next, the electrolyte 5 was injected into the container 1. The electrolyte comprises a supporting electrolyte and an organic solvent. As the organic solvent, there was used a mixed solvent of a low viscosity solvent and a high permittivity solvent.

A joining material is provided in a side wall end part of the container 1, and the sealing plate 6 and the container 1 are welded through the joining material. The joining material is molten and becomes the weld zone 7, thereby joining the container 1 and the sealing plate 6. The joining material may be provided in any one of the container 1 and the sealing plate 6, or both of the container and the sealing plate.

For welding the container and the sealing plate, although a welding method is not limited especially, if the resistance seam welding or the laser seam welding is used, the sealing strength is increased and the heat resistance is improved.

Figure 2:
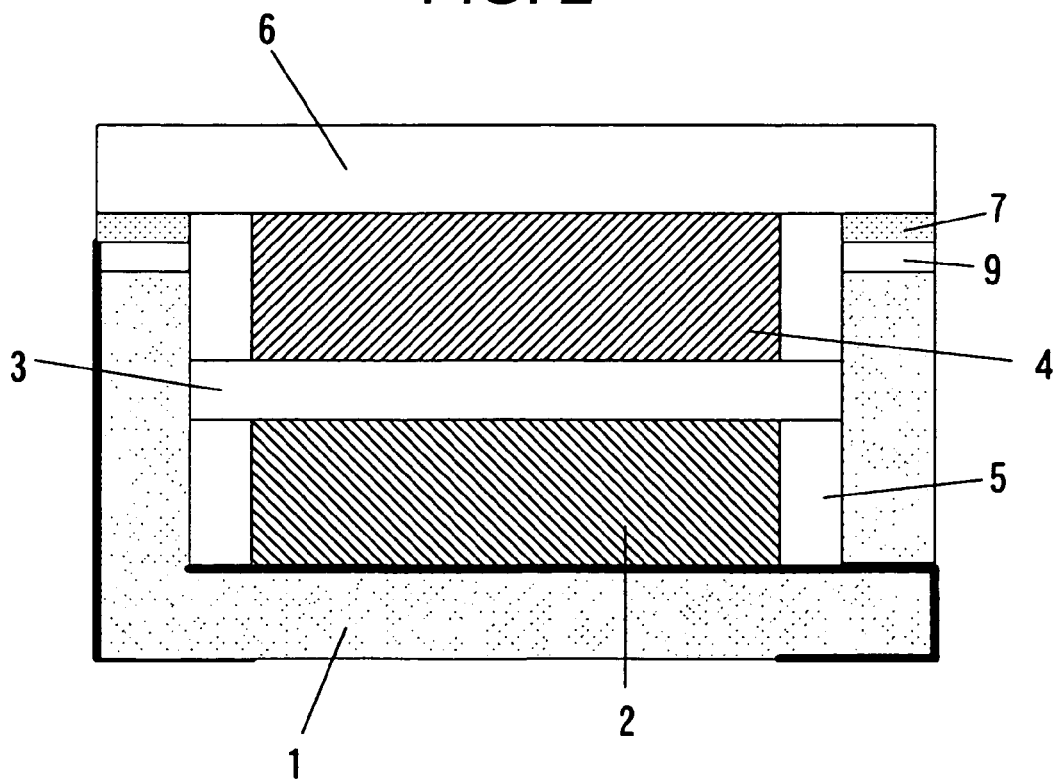
FIG. 2 is a sectional view of the electrochemical cell of the invention.

By using FIG. 2, there is explained a case where the container 1 has a metal ring 9.

The metal ring 9 is provided in the side wall end part of the container 1. The metal ring 9 is formed by applying a nickel plating or the like to an iron-cobalt alloy, and the metal ring 9 is joined to the container 1 by using a brazing filler material. For the brazing filler material, a silver brazing filler and the like are suitable. As a material of the metal ring, one whose thermal expansion coefficient is equal to the container is suitable.

In order to coincide with the metal ring 9, the sealing plate 6 made of the iron-cobalt alloy was mounted on the container 1, and the container 1 and the sealing plate 6 were resistance-welded and sealed under the inert atmosphere. The nickel plating applied to the metal ring 9 was molten to thereby become the weld zone 7, and the sealing plate 6 and the container 1 were joined.

By applying the nickel plating to a portion, of the sealing plate 6, contacting with the metal ring 9, it may be made a joining material.

Figure 3:
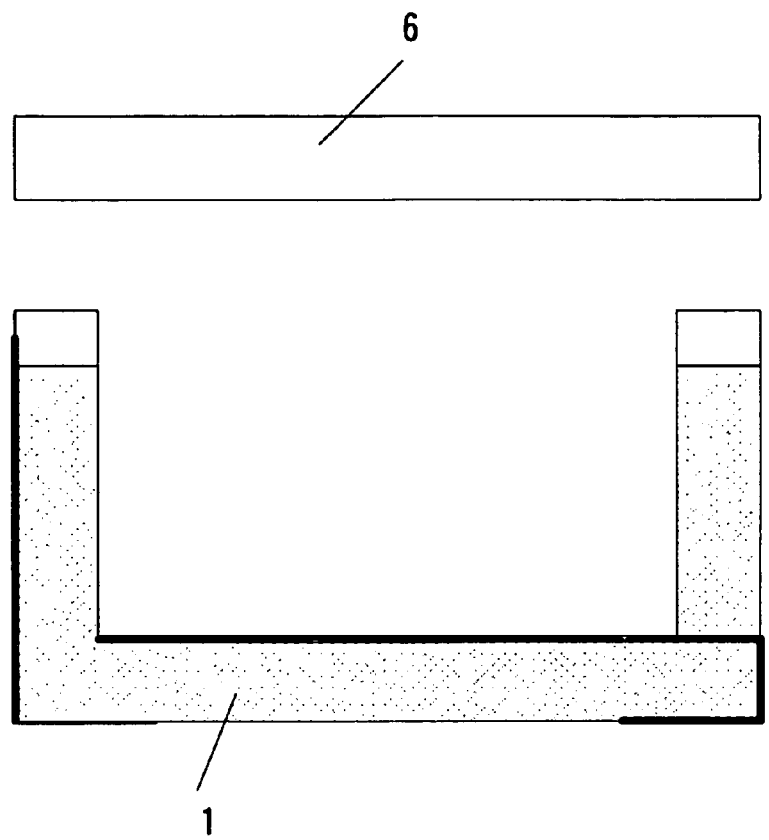
FIG. 3 is a sectional view of a container and a sealing plate, which are used in the electrochemical cell of the invention.
Figure 4:
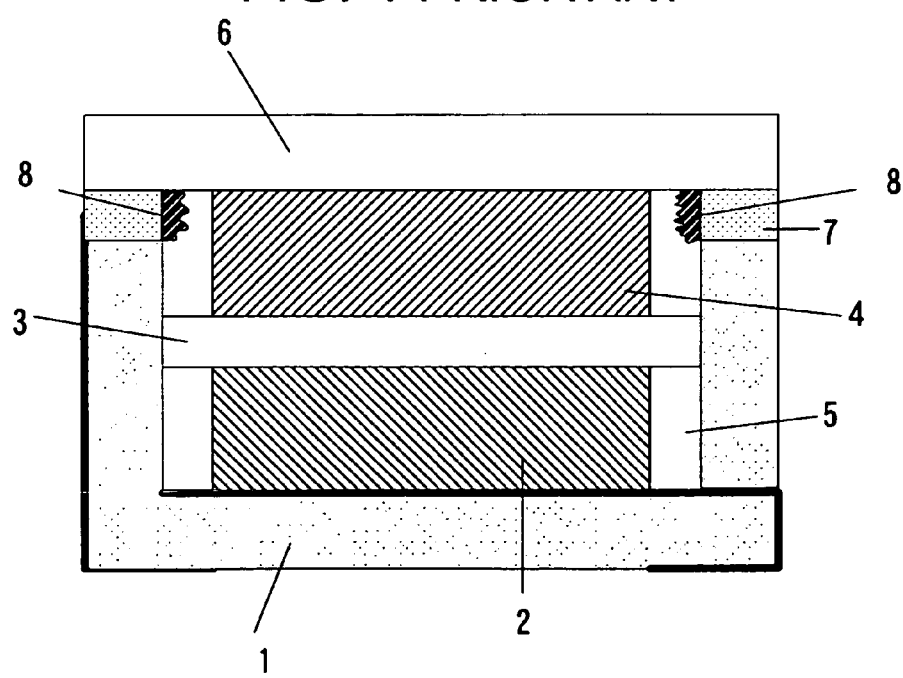
FIG. 4 is a sectional view of a conventional electrochemical cell.

The container and the sealing plate, which are used in the invention, are shown in FIG. 3.

Since the resistance welding was performed in a nitrogen atmosphere, the weld zone 7 between the container and the sealing plate was not oxidized, and there was no fact that the corrosion resistance decreased. For this reason, no corrosion occurred inside the cell, and it was possible to prevent the internal resistance increase and the capacity decrease. Further, the oxidation of the electrolyte by the heat of the welding could be prevented, and it was possible to seal the sealing plate and the container without the electrolyte deteriorating.

A reliability of the sealing is improved without decreasing a welding strength as well. Although the above advantages are obtained if the inert gas atmosphere is used, nitrogen and argon are suitable because they are inexpensive and easily available. Additionally, by making a dew point in the inert gas atmosphere 0 degree or lower, it was possible to prevent a moisture from mixing into the electrolyte. There was no fact that the electrolyte was decomposed by the moisture and thus the internal resistance increased, and there was no fact that characteristics of the electrochemical cell decreased.

The 2nd connection terminal is formed in an outside face of the container, and it was connected to the sealing plate 6 through the metal ring. The electrode 4 contacts with the sealing plate 6, and it was electrically connected to an external circuit through the 2nd connection terminal.

The 1st connection terminal and the 2nd connection terminal may be provided in an outside bottom face part of the container 1 or a side face of the container 1, and a soldering to a board is possible by a wetting with a solder.

As the organic solvent there can be used acetonitrile, diethyl ether, diethyl carbonate, dimethyl carbonate, 1,2-dimethoxyethane, tetrahydrofuran, propylene carbonate (PC), ethylene carbonate (EC), γ-butyrolactone (γ BL), and the like.

Embodiment 1

An electrical double layer capacitor was made by using an accommodation container of a shape similar to FIG. 1. The container 1 is made of alumina, and its size is 5×5×1 mm. A nickel plating layer is formed in the side wall end part of the container 1, and the sealing plate 6 and the container 1 are welded through the nickel plating layer. A concave dent was made 0.6 mm in depth, and 3×4 mm in size. A wiring of each of the 1st connection terminal and the 2nd connection terminal was one in which the gold plating was applied to a tungsten upper part. As the sealing plate, there was used an iron-cobalt alloy plate of 0.15 mm in thickness.

Figure 5:
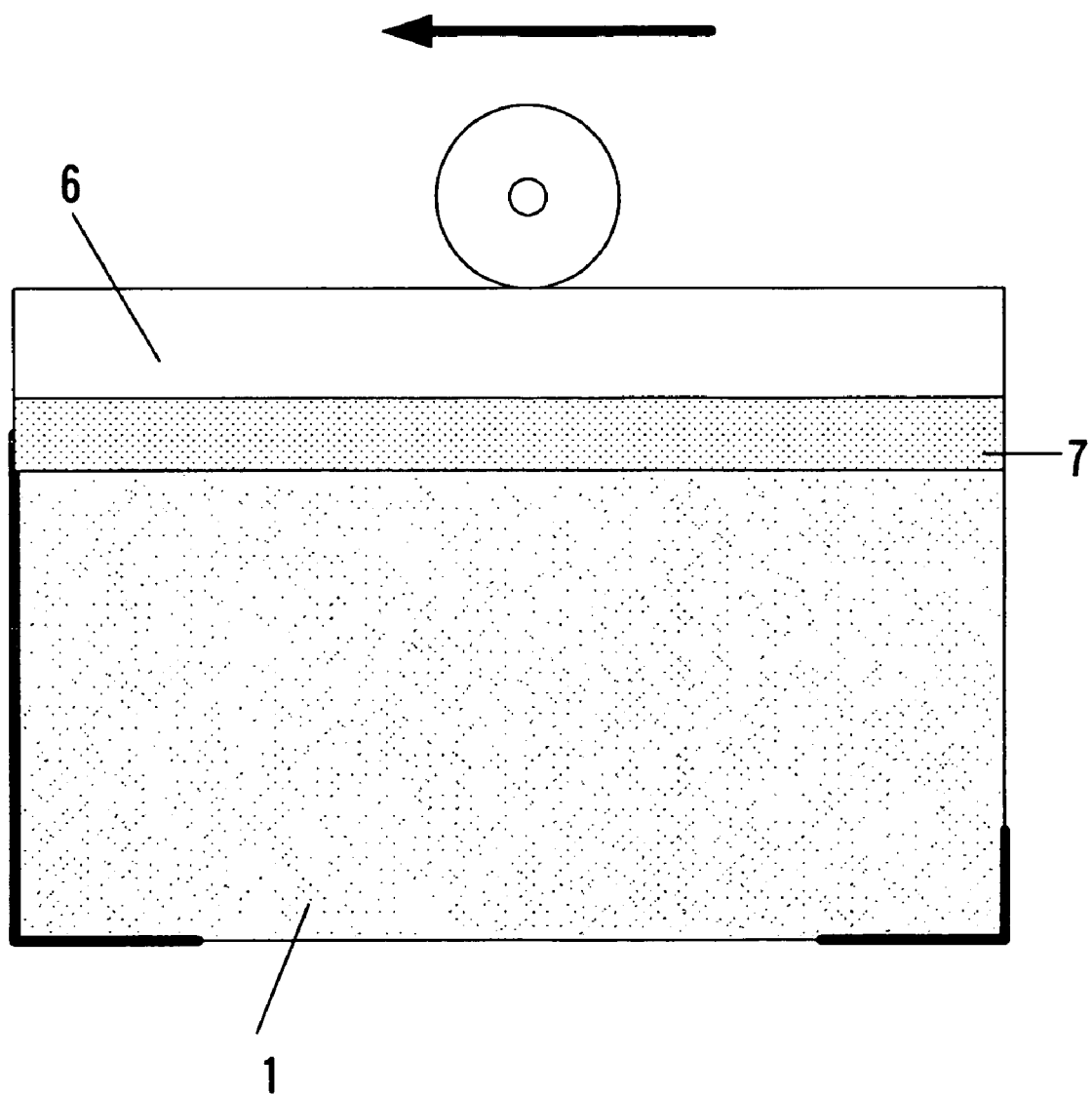
FIG. 5 is a mode showing a process of welding the container and the sealing plate, which are used in the electrochemical cell of the invention.

Each of the electrode 2 and the electrode 4 is 2×3 mm and 0.15 mm in thickness, and was made by compression-molding activated carbon with fluororesin being used as a binder. The 1st electrode 2 was bonded to a bottom part of the concave container 1 by an electrically conductive adhesive. The 2nd electrode 4 was bonded to the sealing plate 6 by the electrically conductive adhesive. Next, the separator 3 was mounted on the electrode 2, and the electrolyte in which 1 mol/L of $(C_2H_5)_4NBF_4$ had been added by to propylene carbonate (PC) was added. After the sealing plate 6 to which the electrode 4 had been bonded was mounted to the container 1, and the sealing plate 6 and the container 1 were spot-welded in the nitrogen atmosphere to thereby be provisionally fixed, they were seam-welded by a principle of the resistance welding by pressing opposed roller type electrodes to opposed two sides of the sealing plate 6 and flowing an electric current. In FIG. 5, there is shown a mode for seam-welding the electrochemical cell.

Embodiment 2

Similarly, the Embodiment 2 was made by using the container 1 of a shape similar to that of FIG. 2. As the electrode, the separator and the electrolyte, they were used same ones as the Embodiment 1. The container 1 is made of alumina, and its size is 5×5×1 mm. The metal ring 9 in which the nickel plating had been applied to the iron-cobalt alloy was joined to the side wall end part of the container 1 by using the silver blazing filler. The concave dent was made 0.6 mm in depth, and 3×4 mm in size. The wiring of each of the 1st connection terminal and the 2nd connection terminal was one in which the gold plating was applied to the tungsten upper part. As the sealing plate, there was used the iron-cobalt alloy plate of 0.15 mm in thickness.

Next, as to the Embodiment 1 and the Embodiment 2, which had been thus made, the reflow soldering was performed by actually applying a cream solder to a position of the connection terminal on the board. Although a heating was performed under conditions that a 1st heating was at 160° C. for 2 minutes and subsequently a 2nd heating at 200° C. or higher for 1 minute (highest reached temperature 260° C.), in both no bursting and the like occurred. Further, the electrochemical cell of each of the Embodiments 1 and 2 is low also in its internal resistance and has excellent characteristics.

Further, a Comparative example was made by welding in the atmospheric air. The material used in the Comparative example was similar to that in the Embodiment 1. A difference is only an atmosphere at the seal welding time.

In Table 1, there are shown experimental results of discharge capacities in the Embodiments 1 and 2 and the Comparative example.

TABLE 1

| | Welding atmosphere | Initial capacity (2.5 V charging) | After 1000 hours | Capacity decrease rate |
|---|---|---|---|---|
| Embodiment 1 | Nitrogen | 0.04 F. | 0.04 F. | 0% |
| Embodiment 2 | Nitrogen | 0.04 F. | 0.04 F. | 0% |
| Comparative example | Air | 0.04 F. | 0.03 F. | 25% |

In the Embodiments 1 and 2 and the Comparative example, when the charging was performed under 2.5 V and the initial capacity was measured, it was 0.04 F in all. Additionally, when the charging was performed at room temperature 70° C., under 2.5 V and for 1000 hours and the discharge capacity was measured, it was 0.04 F in the Embodiment 1 and the Embodiment 2, which was the same as the initial capacity.

On the other hand, in the Comparative example, the discharge capacity after charging at room temperature 70° C., under 2.5 V and for 1000 hours was 0.03 F, which was decreased by 0.01 F in comparison with the initial capacity. Although the capacity decrease rate was 0% in the Embodiment 1 and the Embodiment 2, it was 25% in the Comparative example. This is because the corrosion occurred from the weld zone in the Comparative example during the charging performed at room temperature 70° C., under 2.5 V and for 1000 hours, and the electrolyte and the electrode deteriorated.

Embodiment 3

The Embodiment 3 is explained below. It is the electrochemical cell in which epoxy resin was used as the container. A sectional view of the electrochemical cell is the same as in FIG. 2.

As a resin used in the container, there are suited polyphenylene sulfide, polyethylene terephthalate, polyamide, polyimide, polyetherether-ketone, liquid crystal polymer, and epoxy resin. By using the resin in the container, it is possible to inexpensively make the container.

The electrode and the electrolyte used were the same as in the Embodiment 1. The connection terminals, the metal ring 9 and the epoxy resin are insert-molded, thereby forming the container 1. As the 1st connection terminal and the 2nd connection terminal, a metal plate is used. The 2nd connection terminal and the metal ring 9 are electrically connected. The metal plate and the epoxy resin are insert-molded, and the 1st connection terminal, the 2nd connection terminal and the metal ring 9 are embedded inside the container 1.

Each of the electrode 2 and the electrode 4 was a size of 2×3 mm and 0.15 mm in thickness, and was made by compression-molding activated carbon with fluororesin being used as the binder. The 1st electrode 2 was bonded to the bottom part of the concave container 1 by the electrically conductive adhesive. The 2nd electrode 4 was bonded to the sealing plate 6 by the electrically conductive adhesive. Next, the separator 3 was mounted on the electrode 2, and the electrolyte in which 1 mol/L of $(C_2H_5)_4NBF_4$ had been added to propylene carbonate (PC) was added. After the sealing plate 6 to which the electrode 4 had been bonded was mounted and the sealing plate 6 and the container 1 were spot-welded in a pressurized argon atmosphere to thereby be provisionally fixed, they were seam-welded by the principle of the resistance welding by pressing opposed roller type electrodes to opposed two sides of the sealing plate 6 and flowing the electric current. As to the electrical double layer capacitor thus made, the reflow soldering was performed by applying the cream solder to the position of the connection terminal on the board. Although the heating was performed under conditions that the 1st heating is at 160° C. for 2 minutes and subsequently the 2nd heating at 200° C. or higher for 1 minute (highest reached temperature 260° C.), no bursting and the like occurred. Further, the electrochemical cell of the Embodiment 3 is low also in its internal resistance and has excellent characteristics.

Embodiment 4

A nonaqueous electrolyte secondary battery was made by using the container similar to that of the Embodiment 1.

A positive electrode active material was obtained by adding graphite as an electrically conductive agent and polyacrylic acid as a binding agent to one in which commercial $MoO_3$ had been pulverized, and then mixing them. A mixing weight ratio of the positive electrode active material is $MoO_3$:graphite:polyacrylic acid=53:45:2. Next, this positive electrode active material 5 mg was pressure-molded by 2 ton/cm² and made a positive electrode. The positive electrode thus obtained was bonded to the container by an electrically conductive adhesive containing carbon and they were made one body, and it was heated and dried under a reduced pressure at 250° C. for 8 hours.

One in which commercial $SiO_2$ had been pulverized was used as an active material of a negative electrode. A negative electrode active material was obtained by adding graphite as the electrically conductive agent and polyacrylic acid as the binding agent to this active material. A mixing weight ratio of the negative electrode active material is $SiO_2$:graphite:polyacrylic acid=45:40:15. The negative electrode active material 1.1 mg was pressure-molded by 2 ton/cm² and a negative electrode was obtained. After the negative electrode thus obtained had been bonded to the sealing plate by the electrically conductive adhesive and they had been made one body, it was heated and dried under the reduced pressure at 250° C. for 8 hours. Additionally, a lithium foil was pressure-bonded onto the negative electrode. For the separator, there was used a nonwoven fabric of 0.2 mm in thickness, which comprised glass fibers.

As the electrolyte, there was used one in which lithium borofluoride ($LiBF_4$) had been dissolved by 1 mol/L into a volume ratio 1:1 mixed solvent of ethylene carbonate (EC):γ-butyrolactone (γ BL).

After the sealing plate 6 to which the electrode 4 had been bonded was covered and the sealing plate 6 and the container 1 were spot-welded in the nitrogen atmosphere to thereby be provisionally fixed, they were seam-welded by the principle of the resistance welding by pressing opposed roller type electrodes to opposed two sides of the sealing plate 6 and flowing the electric current.

Next, as to the secondary battery which had been thus made, the reflow soldering was performed by actually applying the cream solder to the position of the connection terminal on the board. Although the heating was performed under conditions that the 1st heating was at 160° C. for 2 minutes and subsequently the 2nd heating at 200° C. or higher for 1 minute (highest reached temperature 260° C.), no bursting and the like occurred. The electrochemical cell of the Embodiment 4 is low also in its internal resistance and has excellent characteristics.

For the sealing plate 6, since it functions also as the current collector, it is possible to use a metal such as iron-cobalt alloy, iron-nickel alloy, nickel, copper, stainless, and aluminum.

For the separator 3, there is used an insulating film having a high ion permeability and having a predetermined mechanical strength. In the reflow soldering, although the glass fibers can be used most stably, it is also possible to use a resin whose heat distortion temperature is 230° C. or higher such as polyphenylene sulfide, polyethylene terephthalate, polyamide, and polyimide. A hole diameter and a thickness of the separator are not limited especially, and are designing matters determined on the basis of a current value and a capacitor internal resistance of an equipment used. Further, it is also possible to use a porous material of ceramic.

As the supporting electrolyte used in the electrolyte, there can be used $(C_2H_5)_4PBF_4$, $(C_3H_7)_4PBF_4$, $(CH_3)(C_2H_5)_3NBF_4$, $(C_2H_5)_4NBF_4$, $(C_2H_5)_4PPF_6$, $(C_2H_5)_4PCF_3SO_4$, $(C_2H_5)_4NPF_6$, lithium perchlorate ($LiClO_4$), lithium phosphate hexafluoride ($LiPF_6$), lithium borofluoride ($LiBF_4$), arsenic lithium hexafluoride ($LiAsF_6$), lithium trifluorometasulfonic acid ($LiCF_3SO_3$), lithium bistri-fluoro-methyl sulfonyl imide [$LiN(CF_3SO_2)_2$], thiocyanate, aluminum fluoride salt, lithium salt, and the like.

What is claimed is:

1. An electrochemical cell comprising: a positive electrode; a negative electrode; a separator for separating the positive and negative electrodes from one another; an electrolyte; a container accommodating the positive and negative electrodes, the separator and the electrolyte; and a sealing plate for sealing the container, the sealing plate being welded to the container with a joining material under an inert atmosphere to form an unoxidized weld zone that integrally joins the sealing plate to the container and that is disposed in direct physical contact with the electrolyte.

2. An electrochemical cell according to claim 1; wherein the inert atmosphere is nitrogen or argon.

3. An electrochemical cell according to claim 1; wherein the weld zone comprises a resistance seam welding zone.

4. An electrochemical cell according to claim 1; wherein the container is made of a heat-resistant material.

5. An electrochemical cell according to claim 1; wherein the container is made of a ceramic or a glass; and further comprising a metal ring disposed in the container and in contact with the sealing plate.

6. An electrochemical cell according to claim 1; wherein the container is made of a resin; and further comprising a metal ring disposed in contact with the sealing plate.

7. An electrochemical cell according to claim 1; wherein the container is made of an epoxy resin; and further comprising a metal ring disposed in contact with the sealing plate.

8. An electrochemical cell according to claim 1; wherein the sealing plate welded to the container under a pressurized inert atmosphere.

9. An electrochemical cell according to claim 1; wherein a dew point in the inert atmosphere is 0 degree or lower.

10. An electrochemical cell according to claim 1; wherein the weld zone comprises a laser seam welding zone.

11. An electrochemical cell comprising: a container having a main surface and a cavity containing therein a positive electrode, a negative electrode, a separator separating the positive and negative electrodes from one another, and an electrolyte; and
 a sealing plate that seals the cavity of the container, the sealing plate being bonded to the main surface of the container with an unoxidized weld that is disposed in direct physical contact with the electrolyte.

12. An electrochemical cell according to claim 11; wherein the unoxidized weld comprises a resistance seam weld.

13. An electrochemical cell according to claim 11; wherein the unoxidized weld comprises a laser seam weld.

14. An electrochemical cell according to claim 11; wherein the container is made of a heat-resistant material.

15. An electrochemical cell according to claim 11; wherein the container is made of a ceramic material or a glass material; and further comprising a metal ring disposed in the container and in contact with the sealing plate.

16. An electrochemical cell according to claim 11; wherein the container is made of a resin material; and further comprising a metal ring disposed in contact with the sealing plate.

17. An electrochemical cell according to claim 11; wherein the container is made of an epoxy resin; and further comprising a metal ring disposed in contact with the sealing plate.

18. An electrochemical cell according to claim 1; wherein the electrolyte comprises an unoxidized electrolyte.

* * * * *